(12) United States Patent
Jungreis et al.

(10) Patent No.: US 8,693,213 B2
(45) Date of Patent: Apr. 8, 2014

(54) RESONANT POWER FACTOR CORRECTION CONVERTER

(75) Inventors: Aaron Jungreis, Richardson, TX (US); Paul Garrity, Rockwall, TX (US)

(73) Assignee: Flextronics AP, LLC, Broomfield, CO (US)

( * ) Notice: Subject to any disclaimer, the term of this patent is extended or adjusted under 35 U.S.C. 154(b) by 127 days.

(21) Appl. No.: 12/154,321

(22) Filed: May 21, 2008

(65) Prior Publication Data
US 2009/0290385 A1 Nov. 26, 2009

(51) Int. Cl.
*H02M 3/335* (2006.01)

(52) U.S. Cl.
USPC .................................................. 363/17

(58) Field of Classification Search
USPC ........ 363/16, 17, 132, 21.02, 21.03; 323/266, 323/272
See application file for complete search history.

(56) References Cited

U.S. PATENT DOCUMENTS

| | | |
|---|---|---|
| 4,051,425 A | 9/1977 | Smith ........................... 363/86 |
| 4,184,197 A | 1/1980 | Cuk et al. |
| 4,370,703 A | 1/1983 | Risberg |
| 4,563,731 A * | 1/1986 | Sato et al. ..................... 363/17 |
| 4,645,278 A | 2/1987 | Yevak et al. |
| 4,695,933 A | 9/1987 | Nguyen et al. |
| 4,712,160 A | 12/1987 | Sato et al. ..................... 361/388 |
| 4,788,626 A | 11/1988 | Neidig et al. .................. 361/386 |
| 4,806,110 A | 2/1989 | Lindeman |
| 4,823,249 A | 4/1989 | Garcia, II |
| 4,841,220 A | 6/1989 | Tabisz et al. |
| 4,857,822 A | 8/1989 | Tabisz et al. |
| 4,866,367 A | 9/1989 | Ridley et al. |
| 4,893,227 A | 1/1990 | Gallios et al. |
| 4,899,256 A | 2/1990 | Sway-Tin ..................... 361/386 |
| 4,901,069 A | 2/1990 | Veneruso |
| 4,975,821 A | 12/1990 | Lethellier |
| 5,065,302 A | 11/1991 | Kanazawa |
| 5,090,919 A | 2/1992 | Tsuji |
| 5,101,322 A | 3/1992 | Ghaem et al. ................. 361/386 |
| 5,164,657 A | 11/1992 | Gulczynski ................... 323/275 |
| 5,235,491 A | 8/1993 | Weiss ............................ 361/694 |
| 5,262,932 A | 11/1993 | Stanley et al. ................ 363/26 |
| 5,295,044 A | 3/1994 | Araki et al. ................... 361/709 |
| 5,325,283 A | 6/1994 | Farrington |

(Continued)

FOREIGN PATENT DOCUMENTS

| | | |
|---|---|---|
| JP | 4217869 A | 8/1992 |
| JP | 10243640 A | 9/1998 |
| JP | 2000083374 A | 3/2000 |
| JP | 2000253648 A | 9/2000 |
| JP | 2004208357 A | 7/2004 |

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Jue Zhang
(74) *Attorney, Agent, or Firm* — Haverstock & Owens LLP

(57) ABSTRACT

An AC-to-DC power converter configured to provide power factor correction and a single isolated low-voltage output. The power converter includes a single-stage resonant power converter including an isolation transformer, a resonant tank, a rectifier, and a bulk storage capacitor coupled to an output of the isolation transformer. In typical applications, at least one non-isolated power converter is coupled to the output of the single-stage isolated power factor correction converter.

72 Claims, 8 Drawing Sheets

(56) References Cited

U.S. PATENT DOCUMENTS

| | | | |
|---|---|---|---|
| 5,365,403 A | 11/1994 | Vinciarelli et al. | |
| 5,373,432 A * | 12/1994 | Vollin et al. | 363/16 |
| 5,438,294 A | 8/1995 | Smith | |
| 5,442,540 A | 8/1995 | Hua | |
| 5,490,052 A | 2/1996 | Yoshida et al. | |
| 5,565,761 A | 10/1996 | Hwang | 323/222 |
| 5,565,781 A | 10/1996 | Dauge | 324/403 |
| 5,592,128 A | 1/1997 | Hwang | 331/61 |
| 5,673,185 A | 9/1997 | Albach et al. | |
| 5,712,772 A | 1/1998 | Telefus et al. | |
| 5,742,151 A | 4/1998 | Hwang | 323/222 |
| 5,747,977 A | 5/1998 | Hwang | 323/284 |
| 5,786,687 A | 7/1998 | Faulk | |
| 5,786,992 A | 7/1998 | Vinciarelli et al. | |
| 5,790,395 A | 8/1998 | Hagen | |
| 5,798,635 A | 8/1998 | Hwang et al. | 323/222 |
| 5,804,950 A | 9/1998 | Hwang et al. | 323/222 |
| 5,811,895 A | 9/1998 | Suzuki et al. | 307/125 |
| 5,818,207 A | 10/1998 | Hwang | 323/288 |
| 5,838,554 A | 11/1998 | Lanni | |
| 5,859,771 A * | 1/1999 | Kniegl | 363/132 |
| 5,870,294 A | 2/1999 | Cyr | 363/41 |
| 5,894,243 A | 4/1999 | Hwang | 327/540 |
| 5,903,138 A | 5/1999 | Hwang et al. | 323/266 |
| 5,905,369 A | 5/1999 | Ishii et al. | |
| 5,923,543 A | 7/1999 | Choi | |
| 5,949,672 A | 9/1999 | Bernet | |
| 5,978,238 A | 11/1999 | Liu | |
| 6,009,008 A | 12/1999 | Pelly | |
| 6,058,026 A | 5/2000 | Rozman | |
| 6,069,803 A | 5/2000 | Cross | 363/21 |
| 6,091,233 A | 7/2000 | Hwang et al. | 232/222 |
| 6,160,725 A | 12/2000 | Jansen | 363/65 |
| 6,183,302 B1 | 2/2001 | Daikuhara et al. | |
| 6,191,957 B1 | 2/2001 | Peterson | |
| 6,272,015 B1 | 8/2001 | Mangtani | 361/707 |
| 6,275,397 B1 | 8/2001 | McClain | |
| 6,282,092 B1 | 8/2001 | Okamoto et al. | 361/704 |
| 6,307,761 B1 | 10/2001 | Nakagawa | |
| 6,323,627 B1 | 11/2001 | Schmiederer et al. | |
| 6,326,740 B1 | 12/2001 | Chang et al. | |
| 6,344,980 B1 | 2/2002 | Hwang et al. | 363/210.1 |
| 6,366,483 B1 | 4/2002 | Ma et al. | |
| 6,385,059 B1 | 5/2002 | Telefus et al. | |
| 6,388,897 B1 * | 5/2002 | Ying et al. | 363/17 |
| 6,390,854 B2 | 5/2002 | Yamamoto et al. | |
| 6,396,277 B1 | 5/2002 | Fong et al. | 324/402 |
| 6,396,716 B1 | 5/2002 | Liu et al. | |
| 6,407,514 B1 | 6/2002 | Glaser et al. | 315/247 |
| 6,452,816 B2 | 9/2002 | Kuranuki | |
| 6,459,175 B1 | 10/2002 | Potega | |
| 6,469,914 B1 | 10/2002 | Hwang et al. | 363/210.1 |
| 6,469,980 B1 | 10/2002 | Takemura et al. | 369/275.3 |
| 6,483,281 B2 | 11/2002 | Hwang | 323/299 |
| 6,487,095 B1 | 11/2002 | Malik et al. | |
| 6,487,098 B2 | 11/2002 | Malik et al. | |
| 6,531,854 B2 | 3/2003 | Hwang | 323/285 |
| 6,541,944 B2 | 4/2003 | Hwang | 323/225 |
| 6,549,409 B1 | 4/2003 | Saxelby et al. | |
| 6,578,253 B1 | 6/2003 | Herbert | |
| 6,583,999 B1 | 6/2003 | Spindler et al. | |
| 6,605,930 B2 | 8/2003 | Hwang | 323/225 |
| 6,618,274 B2 | 9/2003 | Boylan et al. | |
| 6,650,552 B2 | 11/2003 | Takagi et al. | |
| 6,654,261 B2 | 11/2003 | Welches et al. | |
| 6,657,417 B1 | 12/2003 | Hwang | 323/222 |
| 6,671,189 B2 | 12/2003 | Jansen et al. | 363/21.14 |
| 6,674,272 B2 | 1/2004 | Hwang | 323/284 |
| 6,775,162 B2 | 8/2004 | Mihai et al. | |
| 6,894,461 B1 | 5/2005 | Hack et al. | |
| 6,899,434 B2 | 5/2005 | Morishita | |
| 6,958,920 B2 | 10/2005 | Mednik et al. | 363/19 |
| 6,970,366 B2 | 11/2005 | Apeland et al. | |
| 6,989,997 B2 | 1/2006 | Xu | |
| 7,038,406 B2 | 5/2006 | Wilson | |
| 7,047,059 B2 | 5/2006 | Avrin et al. | 600/409 |
| 7,064,497 B1 | 6/2006 | Hsieh | |
| 7,102,251 B2 | 9/2006 | West | |
| 7,139,180 B1 | 11/2006 | Herbert | |
| 7,208,833 B2 | 4/2007 | Nobori et al. | |
| 7,274,175 B2 * | 9/2007 | Manolescu | 323/267 |
| 7,286,376 B2 | 10/2007 | Yang | |
| 7,315,460 B2 | 1/2008 | Kyono | |
| 7,324,354 B2 | 1/2008 | Joshi et al. | |
| 7,386,286 B2 | 6/2008 | Petrovic et al. | |
| 7,545,256 B2 | 6/2009 | O'Toole et al. | |
| 7,564,706 B1 | 7/2009 | Herbert | |
| 7,570,497 B2 | 8/2009 | Jacques et al. | |
| 7,596,007 B2 | 9/2009 | Phadke | |
| 7,639,520 B1 | 12/2009 | Zansky et al. | |
| 7,764,515 B2 | 7/2010 | Jansen et al. | |
| 7,830,684 B2 | 11/2010 | Taylor | |
| 7,924,578 B2 | 4/2011 | Jansen et al. | |
| 8,059,434 B2 | 11/2011 | Huang et al. | |
| 8,125,181 B2 | 2/2012 | Gregg et al. | |
| 8,126,181 B2 | 2/2012 | Yamamoto et al. | |
| 8,134,848 B2 | 3/2012 | Whittam et al. | |
| 8,155,368 B2 | 4/2012 | Cheung et al. | |
| 8,194,417 B2 | 6/2012 | Chang | |
| 8,207,717 B2 | 6/2012 | Uruno et al. | |
| 8,243,472 B2 | 8/2012 | Chang et al. | |
| 8,344,689 B2 | 1/2013 | Boguslavskij | |
| 8,369,111 B2 | 2/2013 | Balakrishnan et al. | |
| 8,400,801 B2 | 3/2013 | Shinoda | |
| 2002/0008963 A1 | 1/2002 | Dibene, II et al. | |
| 2002/0011823 A1 | 1/2002 | Lee | 320/137 |
| 2002/0036200 A1 | 3/2002 | Ulrich | |
| 2003/0035303 A1 | 2/2003 | Balakrishnan et al. | 363/16 |
| 2003/0112645 A1 | 6/2003 | Schlecht | |
| 2004/0183510 A1 | 9/2004 | Sutardja et al. | |
| 2004/0228153 A1 | 11/2004 | Cao et al. | 363/71 |
| 2004/0252529 A1 | 12/2004 | Huber et al. | |
| 2005/0024016 A1 | 2/2005 | Breen et al. | |
| 2005/0036338 A1 | 2/2005 | Porter et al. | |
| 2005/0105224 A1 | 5/2005 | Nishi | 361/18 |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 * | 10/2005 | Green | 315/209 R |
| 2005/0281425 A1 | 12/2005 | Greuet et al. | 381/331 |
| 2006/0002155 A1 | 1/2006 | Shteynberg et al. | |
| 2006/0022637 A1 | 2/2006 | Wang et al. | |
| 2006/0109696 A1 | 5/2006 | Ren et al. | |
| 2006/0152947 A1 * | 7/2006 | Baker et al. | 363/16 |
| 2006/0213890 A1 | 9/2006 | Kooken et al. | |
| 2006/0232220 A1 | 10/2006 | Melis | |
| 2007/0040516 A1 | 2/2007 | Chen | |
| 2007/0051712 A1 | 3/2007 | Kooken et al. | |
| 2007/0120542 A1 | 5/2007 | LeMay | |
| 2007/0121981 A1 | 5/2007 | Koh et al. | |
| 2007/0138971 A1 | 6/2007 | Chen | |
| 2007/0247091 A1 | 10/2007 | Maiocchi | |
| 2007/0247877 A1 | 10/2007 | Kwon et al. | |
| 2007/0263415 A1 | 11/2007 | Jansen et al. | |
| 2008/0018265 A1 | 1/2008 | Lee et al. | |
| 2008/0191667 A1 | 8/2008 | Kernahan et al. | |
| 2009/0034299 A1 | 2/2009 | Lev | |
| 2009/0196073 A1 | 8/2009 | Nakahori | |
| 2009/0290384 A1 | 11/2009 | Jungreis | |
| 2009/0290385 A1 | 11/2009 | Jungreis et al. | |
| 2009/0300400 A1 | 12/2009 | DuBose | |
| 2010/0289466 A1 | 11/2010 | Telefus | |
| 2010/0317216 A1 | 12/2010 | Pocrass | |
| 2010/0322441 A1 | 12/2010 | Weiss et al. | |
| 2011/0132899 A1 | 6/2011 | Shimomugi et al. | |
| 2012/0112657 A1 | 5/2012 | Van Der Veen et al. | |

OTHER PUBLICATIONS

EE Times.com—"Wireless Beacon Could Recharge Consumer Devices", by R. Colin Johnson, 3 pages, Nov. 6, 2007.

"New Architectures for Radio-Frequency dc/dc Power Conversion", Juan Rivas et al., Laboratory for Electromagnetic and Electronic Systems, Massachusetts Institute of Technology, Room 10-171 Cambridge, MA 02139, pp. 4074-4084, Jan. 2004.

(56) References Cited

OTHER PUBLICATIONS

The Notification of Transmittal of the International Search Report and the Written Opinion of the International Searching Authority, or the Declaration; International Application No. PCT/US2009/065300, International Filing Date Nov. 20, 2009, Authorized Officer Blaine R. Copenheaver, 11 pages.

Bead Probe Handbook Successfully Implementing Agilent Medalist Bead Probes in Practice, "6 Test Fixturing", copyright Agilent Technologies, Inc., 2007, pp. 81-96.

SGS—Thomson Microelectronics Application Note, "An Automatic Line Voltage Switching Circuit", Vajapeyam Sukumar and Thierry Castagnet, copyright 1995 SGS-Thomson Microelectronics, Printed in Italy, 6 pages.

Scollo, P.Fichera R. Electronic Transformer for a 12V Halogen Lamp, 1999, ST Microelectronicspg.1-4.

Stankovic, Aleksandar M. and Hanock Lev-Ari, "Randomized Modulation in Power Electronic Converters", vol. 90, No. 5, May 2002, pp. 782-799.

Tse, K. K., Chung, Henry Shu-Hung, Hui, S. Y., and H.C. So, "Analysis and Special Characteristics of a Spread-Spectrum Technique for Conducted EMI Suppression", IEEE Transactions on Power Electronics, vol. 15., No. 2, Mar. 2000, pp. 399-410.

Hang-Seok Choi et al., Novel Zero-Voltage and Zero-Current-Switching (ZVZCS) Full-Bridge PWM Converter Using Coupled Output Inductor, 2002 IEEE, pp. 641-648.

Notice of Allowance dated Sep. 17, 2010, U.S. Appl. No. 12/079,662, filed Mar. 27, 2008, 27 pages.

Notice of Allowance re. U.S. Appl. No. 12/687,761, filed Jan. 14, 2010, 7 pages.

International Search Report, PCT/US2011/49438, International filing date Aug. 26, 2011, 10 pages.

\* cited by examiner

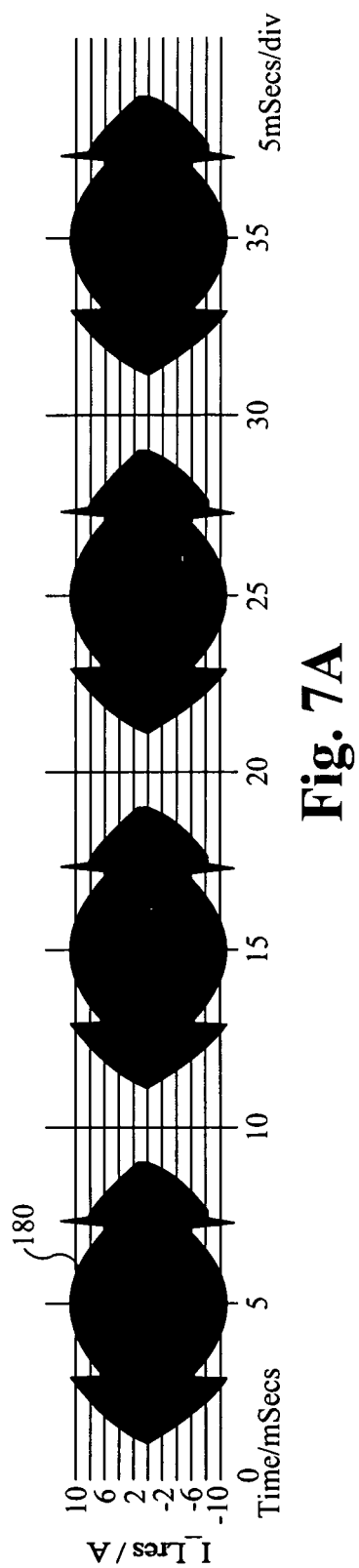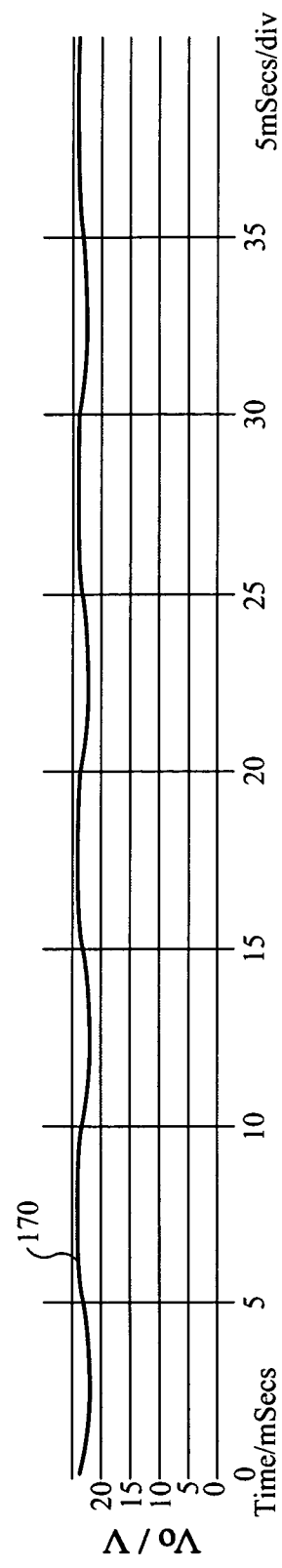
Fig. 7A
Fig. 7B

RESONANT POWER FACTOR CORRECTION CONVERTER

FIELD OF THE INVENTION

The invention relates to power converters. More particularly, the invention relates to a resonant power factor correction converter.

BACKGROUND OF THE INVENTION

A power supply is a device or system that supplies electrical or other types of energy to an output load or group of loads. The term power supply can refer to a main power distribution system and other primary or secondary sources of energy. Power conversion refers to the conversion of one form of electrical power to another desired form and voltage, for example converting 115 or 230 volt alternating current (AC) supplied by a utility company to a regulated lower voltage direct current (DC) for electronic devices, referred to as AC-to-DC power conversion.

A switched-mode power supply, switching-mode power supply or SMPS, is a power supply that incorporates a switching regulator. While a linear regulator uses a transistor biased in its active region to specify an output voltage, an SMPS actively switches a transistor between full saturation and full cutoff at a high rate. The resulting rectangular waveform is then passed through a low-pass filter, typically an inductor and capacitor (LC) circuit, to achieve an approximated output voltage.

Conventional series-regulated linear power supplies maintain a constant voltage by varying their resistance to cope with input voltage changes or load current demand changes. The linear regulator tends to be inefficient. The switch mode power supply, however, uses a high frequency switch, the transistor, with varying duty cycle to maintain the output voltage. The output voltage variations caused by the switching are filtered out by the LC filter.

Linear power supplies and SMPSs can both be used to step-down a supply voltage. However, unlike a linear power supply, an SMPS can also provide a step-up function and an inverted output function. An SMPS converts an input voltage level to another level by storing the input energy temporarily and then releasing the energy to the output at a different voltage. The storage may be in either electromagnetic components, such as inductors and/or transformers, or electrostatic components, such as capacitors.

A variety of different DC-to-DC power converter configurations are currently in use, most of which are variations of a buck converter, a boost converter, and a buck-boost converter. Some versions of the buck converter include the push-pull converter, the forward converter, the half-bridge converter, and the full-bridge converter. A resonant power converter includes an LC tank circuit, which operates such that the current through the inductor and the voltage across the capacitor are substantially sinusoidal. A resonant power converter includes an LC tank circuit. The LC tank circuit comprises one or more inductors and one or more capacitors, and the LC tank circuit exhibits at least one resonant frequency. In some cases in which the LC tank comprises more than one inductor or more than one capacitor, the LC tank circuit may exhibit more than one resonant frequency. Whereas hard-switched or soft-switched power converters are controlled by adjusting the pulse-width-modulation duty cycle, a resonant power converter is controlled by shifting a parameter of the circuit to cause it to operate at a frequency closer to or further from a resonant frequency. In a resonant converter, the transistor switches are typically switched in a manner that causes little or no switching losses by timing the switching to occur when the voltage across the switch or the current through the switch is close to zero.

A configuration using a push-pull converter is similar to the half-bridge converter configuration except that the push-pull converter configuration center taps the primary transformer. A configuration using a full-bridge converter is similar to the half-bridge converter configuration except that the full-bridge converter includes two transistor switches coupled to each end of the transformer primary, as opposed to one end as in the half-bridge converter.

The power factor of an AC electric power system is defined as the ratio of the real power to the apparent power, and is a number between 0 and 1. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. Low-power-factor loads increase losses in a power distribution system and result in increased energy costs. Power factor correction (PFC) is a technique of counteracting the undesirable effects of electric loads that create a power factor that is less than 1. Power factor correction attempts to adjust the power factor to unity (1.00).

AC-to-DC converters above 65 W, as well as some specific applications below 65 W, require the converter to draw current from the AC line with a high power factor and low harmonic distortion. Most conventional methods to produce a power factor corrected power supply with multiple isolated low voltage DC outputs include multiple converter stages and have significant problems with cross-regulation of the output voltages. The term "isolation" refers to isolating the input voltage from the output voltage. In particular, isolating means there is no direct conductive path between the power supply's input source and its output terminals or load. Isolation is achieved using a power transformer in series with the power flow from input to output. Isolation can be applied to the power converter as a whole, or to individual components within the power converter where the voltage input to the component is isolated from the voltage output from the component. Cross-regulation refers to regulating one element in the converter, such as one of several DC output voltages, while simultaneously regulating another element in the circuit, such as another of several DC output voltages. Furthermore, conventional methods require the isolation transformer to step down a high-voltage bus to low voltage outputs, a practice which requires a large turns-ratio and leads to transformer designs that are not optimal for electro-magnetic interference (EMI) or cross-regulation. These designs also typically include complex control to obtain input current waveforms with high power factor and low total-harmonic-distortion.

Conventional technologies typically fall into one of two categories for mid-power power-factor-corrected isolated converters. The first category uses a boost converter (step-up converter) to produce a high voltage bus, which is then cascaded with an isolated buck-type converter (step-down converter) to step the high voltage bus down to an isolated low voltage output. This technique is relatively expensive and not extremely efficient. The second category uses three cascaded converters with at least one of them, usually the last stage, being an isolated resonant converter. The three cascaded converters are also somewhat inefficient due to the fact that there are three stages. Furthermore, the final resonant stage presents great difficulty in achieving good cross-regulation of the output voltages.

A first conventional high power-factor isolated converter from the first category described above includes a boost converter to produce the high power factor input. Boost converter power factor correction circuits are limited in configurations. Voltage-source boost converters cannot be configured to provide an isolated output so another converter stage is included to provide isolation. Furthermore, boost converters are limited in their ability to be configured for soft-switching and resonant switching techniques, so these boost converters may produce large amounts of EMI, high losses (if operating at high frequency), and they often include expensive boost diodes to avoid problems with large reverse recovery losses in their diodes. Soft-switching, which can be accomplished through zero-voltage switching or zero-current switching, uses circuit resonance to ensure that power transistors switch at or near a zero-voltage level or zero-current level. This reduces the stress of the transistor component and also reduces the high frequency energy that would otherwise be radiated as noise. Hard-switching is the simultaneous presence of voltage across the transistor and current through the transistor when the transistor turns on and when the transistor turns off. This condition results in power dissipation within the device.

FIG. 1 illustrates a block diagram of a first conventional power factor corrected isolated converter. An EMI filter 12 is typically coupled between an AC input source 10 and the rest of the converter to prevent noise from coupling back to the AC source. The EMI filter 12 is coupled to a full-wave diode rectifier 14 configured to provide a rectified sinusoidal input voltage to the rest of the converter. A non-isolated boost converter 16 draws a nearly sinusoidal current from the AC input source 10 and charges a high voltage bulk capacitor to typically 250V to 400V, thereby generating a high-voltage bus. An isolated buck-type converter 18 and an isolation transformer 20 with multiple windings steps the high voltage bus down to one or more isolated low voltage outputs.

The boost converter 16 in FIG. 1 is typically hard-switched. Furthermore, to overcome high switching losses in the boost converter diode, the boost converter 16 typically either uses a silicon carbide diode, which is relatively expensive, or additional parts are added to enable soft-switched transitions, which is also expensive, or the boost converter uses critical or discontinuous conduction mode, which is applicable primarily to low power levels due to the extremely high ripple currents generated at the input of the converter.

The isolated buck-type converter 18, such as a full-bridge converter, uses a multiple-output winding transformer 20 to generate several levels of output voltage. Each of the secondary output voltages is rectified and filtered by rectifiers 22 to generate appropriate DC output voltages. In some cases, the DC output voltages are stacked, e.g. placed in series, to reduce effects of cross-regulation due to changes in the relative output loads. The stack is sometimes positioned after the rectifier, and sometimes before the rectifier, e.g. placing the transformer windings in series. For high-efficiency low-voltage outputs, rectification of the secondary output voltages is typically accomplished with metal-oxide-semiconductor field-effect transistors (MOSFETs) rather than diodes.

To reduce switching noise and increase efficiency, a second conventional high power-factor isolated converter from the second category described above uses a resonant output stage to provide isolation. However, due to the lack of voltage control of these resonant stages, a third cascaded stage is added to remove 100/120 Hz ripple from the high voltage bulk capacitor and to provide voltage control during transients. These resonant output stages also present substantial challenges to obtain cross-regulation of multiple outputs. In addition, the use of three cascaded stages reduces overall converter efficiency.

FIG. 2 illustrates a block diagram of a second conventional power factor corrected isolated converter. The second conventional power converter uses the same hard-switched boost converter as in the first conventional power converter of FIG. 1. In order to increase the efficiency of the step-down isolation stage, the second conventional power converter uses an isolated resonant converter 28 operating exactly at resonance. The resonant converter 28, when operating exactly at resonance, performs similarly as a DC transformer and does not control the ratio of input to output voltage. To remove effects of line-frequency ripple and load transient response from the boost converter stage, an intermediate third stage 24 is coupled between the boost converter 16 and the resonant converter 28. This intermediate stage is typically a non-isolating boost-type converter or a non-isolating buck-type converter.

The second conventional power converter shown in FIG. 2 has a number of problems. The use of three cascaded stages limits efficiency. The use of a resonant converter at the output stage puts significant current stress on the output rectifiers and substantially increases dissipation in the output rectifiers if MOSFETs are used to provide the rectification. The number of turns in each winding of the output transformer is often severely limited by the ratio of output voltages, and there is typically a high step-down ratio in the isolation transformer, which complicates design for low EMI and low proximity effect in the windings. The transformer also often includes a large air gap, which increases losses.

In a conventional application, a resonant converter is used for a halogen lighting application. It is common for many halogen lighting applications to use a half-bridge or push-pull resonant topology in which the output of the transformer is directly connected to the light-bulb, which is the resistive load. The resulting waveform on the input is sinusoidal. As such, the lighting circuit accomplishes power factor correction. However, such lighting circuits are designed to operate with a substantially single input voltage. The input voltage is "substantially" singular in that the lighting circuit is designed to operate over a relatively small range, for example 110V to 125V or 220V to 240V. Any change in the input voltage is automatically transferred to the load, so that during a brown-out for example, the light bulb dims, and during a line swell, the light bulb brightens. Such resonant lighting circuits are not configured to enable universal input voltage operation. Furthermore, resonant lighting circuits have an AC output. The AC output drives the lamp directly with AC voltage.

SUMMARY OF THE INVENTION

A power converter is configured to operate over a relatively large input voltage range and to provide either a single somewhat regulated isolated DC output, or multiple highly-regulated isolated low-voltage DC outputs and a high power factor input with a low overall cost and a high efficiency. In some embodiments, an isolation transformer turns-ratio is on the order of 1, 2, or 4, allowing for flexibility in transformer construction to match a given bobbin, as well as simplifying low-EMI transformer design. Furthermore, control used to obtain high power factor input current waveforms with low total-harmonic-distortion is relatively simple.

The power converter includes an isolated resonant converter at the input to produce a high-efficiency isolated converter without switching losses, without the EMI issues associated with hard-switching, and without the need for expensive diodes to mitigate diode reverse recovery losses. Switches within the resonant converter are driven at approximately 50% duty cycle with dead-time delay. Control of the converter to achieve high power factor is simplified since the input current automatically tracks the input voltage minus the reflected output voltage.

The resonant converter produces a DC output across a single voltage output bus. The DC output voltage is regulated by adjusting a parameter of the circuit to cause the circuit to operate at a frequency that is closer to or further from the resonant frequency. In some embodiments, a switching frequency is adjusted to accomplish regulation of the DC output. In other embodiments, the DC output is regulated by adjusting a resonant frequency of the resonant tank within the resonant converter, for example by adjusting the value of one of the resonant tank components.

In some applications, the single output bus is adequate, thus providing a highly efficient, inexpensive, single-stage isolated converter with power factor correction. In most applications, however, post-processing converters are used to convert the single voltage output bus to the appropriate output voltages. In most cases, the post-processing converters are buck-type converters. Since the resonant converter has only a single output, and each post-processing converter is separately controlled, there are no cross-regulation issues. Furthermore, the design can easily be modified to accommodate any desired output voltages. This is unlike conventional converters that produce multiple outputs from multiple transformer windings. In such a conventional design, difficulties arise in designing the transformer due to the consideration of the exact ratio of each output voltage and the effect of rectifier and inductive voltage drops.

If the output post-processing converters are buck-type converters, they can easily be configured to produce soft-switching through resonant or quasi-resonant configurations. Soft-switching can also be easily accomplished by operating the buck-type converters in critical or discontinuous conduction mode, if the low voltage output bus from the resonant converter is more than double the voltage of any of the outputs. For example, if the output from the resonant converter is 20V to 24V (allowing for 4V of low-frequency line ripple), then outputs of 5V and 3.3V can be derived from soft-switched buck-type converters operating in critical or discontinuous conduction mode. An output voltage of 12V is achieved with minimal switching loss since the voltage at the switching point of the semiconductor switches in the resonant converter is 2Vout-Vin, where Vin is the low voltage output bus from the resonant converter. The voltage at the switching points varies from 0V to 8V if the input varies from 20V to 24V. In this example, where the semiconductor switches are MOSFETs, the use of a single 24V output from the resonant converter has the additional benefit that MOSFETs are most efficient when used at low voltages, and power converter MOSFETs are typically optimized for cost and performance at the 30V level, a voltage level that provides a reasonable design margin around a 24V bus.

The resonant converter of the present invention is configured to operate with soft-switching of the semiconductor switches, thus overcoming the EMI issues associated with hard-switched converters. Conventional boost-type power factor correction circuits often require an expensive high-voltage Schottky diode, such as a Silicon Carbide diode, to mitigate reverse recovery losses. The resonant converter of the present invention overcomes this problem in two ways. First, the output diodes of the resonant converter are switched at zero current, so there is no reverse recovery. Second, the output diodes are low voltage diodes, so inexpensive low-voltage Schottky diodes are used in the resonant converter rather than the high-voltage Schottky diode used by conventional boost power factor correction converters.

Cross-regulation is difficult to achieve on multiple-output power supplies that use multi-winding transformers to obtain the different output voltages due to impedance drops on each winding that varies with load for that particular winding. Furthermore, multi-winding transformers that are used to achieve multiple outputs include turns ratio combinations that may not be practical to achieve with a low number of windings without compromising the actual turns ratio. The power converter of the present invention overcomes these shortcomings by employing separately-controlled buck-type converters for each of the outputs.

Conventional converters that utilize resonant converters for an output stage put a high current stress on the output rectifier. If synchronous MOSFETs are used for the rectification stage (a configuration used for high-efficiency, low voltage output), then the MOSFET losses are increased by a factor of 2 or more by the conventional resonant converter waveform. The power converter of the present invention overcomes this problem by using a higher voltage at the output of the resonant converter, enabling the possibility of using Schottky or fast-recovery diodes rather MOSFETs at the output of the transformer. Diodes dissipate power primarily as a function of their average current, rather than root mean square (rms) current, so the use of a resonant topology does not substantially change the losses incurred by diodes. In the power converter of the present invention, the burden of low-voltage-drop semiconductor switches is shifted to the post-regulating buck-type converters, where the root mean square current in the MOSFETs can be kept low.

BRIEF DESCRIPTION OF THE DRAWINGS

Embodiments of the power converter are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Embodiments of the present invention are directed to a power converter. Those of ordinary skill in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The power converter is configured to provide power factor correction and to output multiple low-voltage outputs. The power converter includes an isolated resonant power converter including an isolation transformer, a rectifier and a bulk storage capacitor coupled to an output of the isolation transformer, and at least one non-isolated power converter coupled between the bulk storage capacitor and each output capacitor of the multiple-output power converter.

Figure 1:
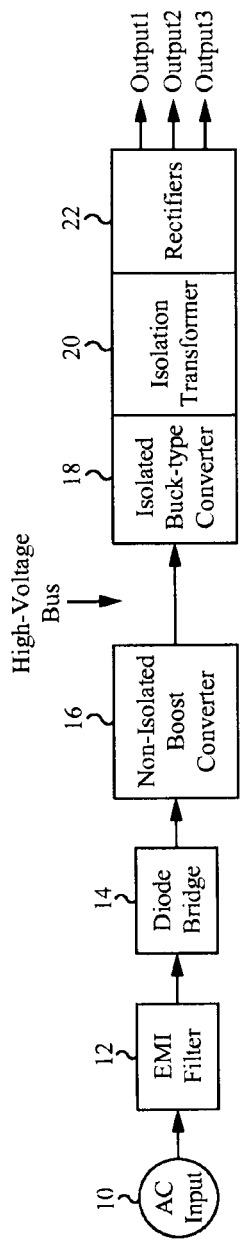
FIG. 1 illustrates block diagram of a first conventional power factor corrected isolated converter.
Figure 2:
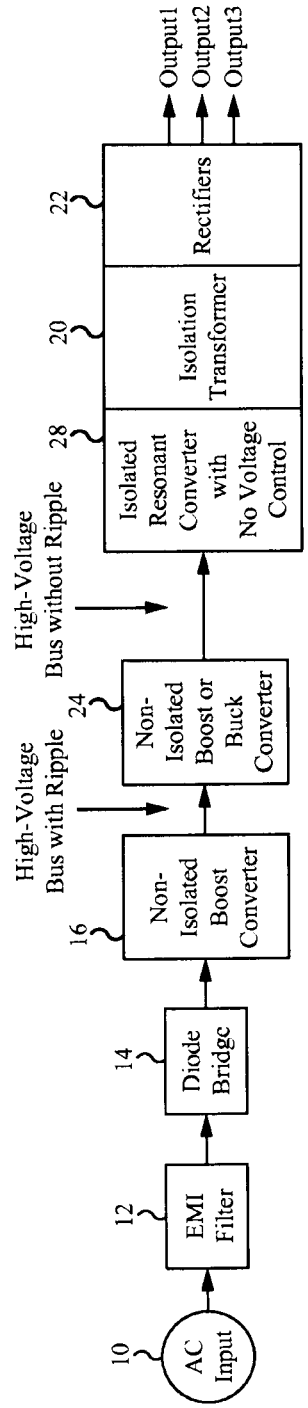
FIG. 2 illustrates a block diagram of a second conventional power factor corrected isolated converter.
Figure 3:
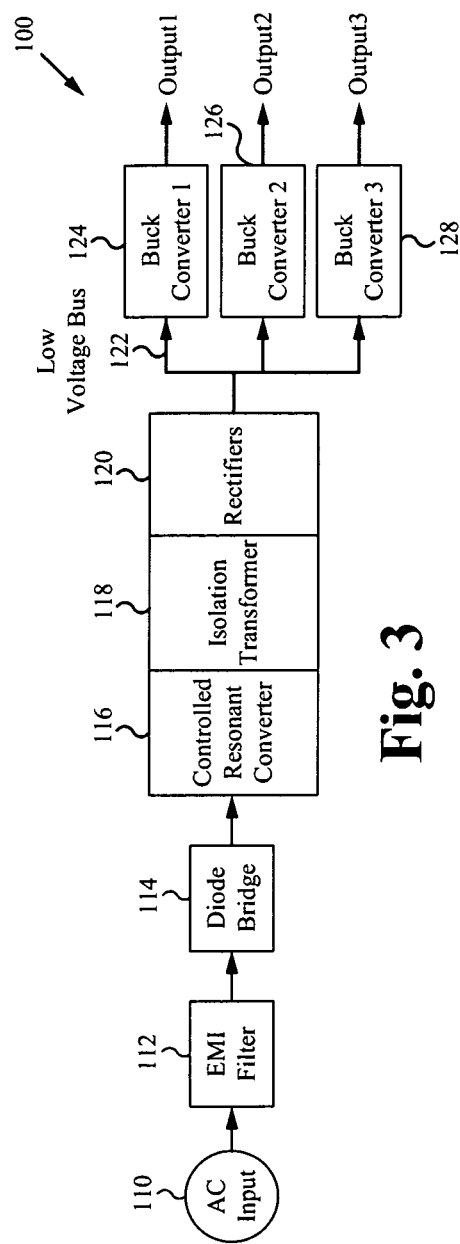
FIG. 3 illustrates an exemplary block diagram of an embodiment of a resonant power factor correction converter of the present invention.

FIG. 3 illustrates a block diagram of an exemplary embodiment of a resonant power factor correction converter of the present invention. The power converter 100 shown in FIG. 3 includes an AC input power source 110, an EMI filter 112, a diode bridge 114, a controlled resonant converter 116, an isolation transformer 118, rectifiers 120, a bulk capacitor that functions as a low voltage bus 122, and a plurality of buck-type converters 124-128. In this exemplary embodiment, the power converter 100 includes three buck-type converters 124, 126, 128. Each buck-type converter is configured to supply a different output voltage. It is understood that the number of output voltages described in relation to the power converter 100 is for exemplary purposes only. In other embodiments, the power converter is configured to generate more, or less, than the three output voltages. Furthermore, some applications may benefit from a power converter that does not include any of the buck-type converters but rather provides low-voltage rectified output 122 as the output from the power converter. Other applications may benefit by replacing one or more of the buck-type converters with boost converters, buck-boost converters, inverters, or any other type of converter stage.

The resonant converter 116 is an isolated converter that draws current from the AC input 110 when the voltage at the AC input exceeds the voltage at the output scaled by the turns ratio of the transformer 118. The resonant converter 116 can be configured in one of many forms of a resonant converter including, but not limited to, a half-bridge converter, a push-pull converter, a full-bridge converter, and a forward converter, as well as various resonant schemes including, but not limited to series resonant, parallel resonant, series-parallel resonant, and LLC resonant.

The output voltage of the transformer 118 is rectified to produce the low voltage bus 122. In an exemplary application, the low voltage bus 122 is maintained at about 20 to 24V for a configuration that produces a highest output voltage of about 12V to 20V and lower output voltages of about 3.3V and about 5V. In the case where the resonant converter 116 is configured as a resonant half-bridge, the turns ratio of the isolation transformer 118 is approximately 1:1 so that the resonant converter 116 draws current whenever the input voltage provided by the AC input 110 is greater than twice the voltage of the low-voltage bus 122. For example, the resonant converter 116 draws current when the input voltage magnitude is above 40 VDC to 48 VDC for a low voltage bus that varies from 20 VDC to 24 VDC, respectively. In the case where the resonant converter 116 is configured as a push-pull converter or a full-bridge converter, the turns ratio of the isolation transformer 118 would be approximately 2:1 for a 20 VDC to 24 VDC low voltage bus rather than the 1:1 ratio in the case of the half-bridge.

If the resonant converter 116 draws a sinusoidal current from the AC power source 110 when the magnitude of the AC voltage input exceeds approximately 48 VDC, the power factor will be above 99% for input voltages of 115 VAC and above, and the harmonic content of the input current will remain within international standards. The value of 48 VDC refers to the instantaneous magnitude of the sinusoidal input voltage. The value of 115 VAC refers to the root mean square (rms) value of the sinusoidal input voltage. If the input voltage is 115 VAC, it varies in magnitude from 0 VDC to 163 VDC. From 0 VDC to 48 VDC, there would be no current drawn. From 48 VDC to 163 VDC there would be current draw.

If the resonant converter 116 is operated at a constant frequency with approximately 50% duty cycle (50% duty cycle minus a dead-time delay to allow soft-switching) over the entire input sinusoidal half-cycle, the resonant converter 116 draws current with an envelope that is similar to the input sinewave. The actual current envelope is closer to a sinusoid minus a DC offset that is determined by the low voltage bus 122. However, in practice, by operating the resonant converter 122 at a constant frequency over the input sinusoidal half-cycle, the input current envelope is close enough to a sinewave to provide power factors in excess of 99% for 115 VAC and above. The resonant converter 116 is only turned off near the zero-crossings of the input sinewave, when the magnitude of the input voltage is less than double the low voltage DC bus 122.

The load power level can be changed by adjusting the resonant converter 116 to operate off-resonance, where the further the resonant converter 116 operates from the resonant point, the lower the power output. The adjustment from resonance is accomplished either by changing the operating frequency of the resonant converter 116 or by adjusting the resonant tank of the resonant converter 116, for example by using a tunable inductor. The ability to operate at constant frequency, with approximately 50% complementary duty cycle for a given load, results in simplified control of the resonant converter 116. The shape of the input current waveform can be shaped to be closer to a sinewave by adjusting the frequency (or resonant tank frequency) over the entire input line half-cycle. Modulation of the operating frequency over the entire input line half-cycle may also lead to a reduction in EMI generated by the AC power source 110. However, the simple control resulting from constant frequency over the input line half-cycle provides adequate power factor and lowest cost for most applications.

Figure 4:
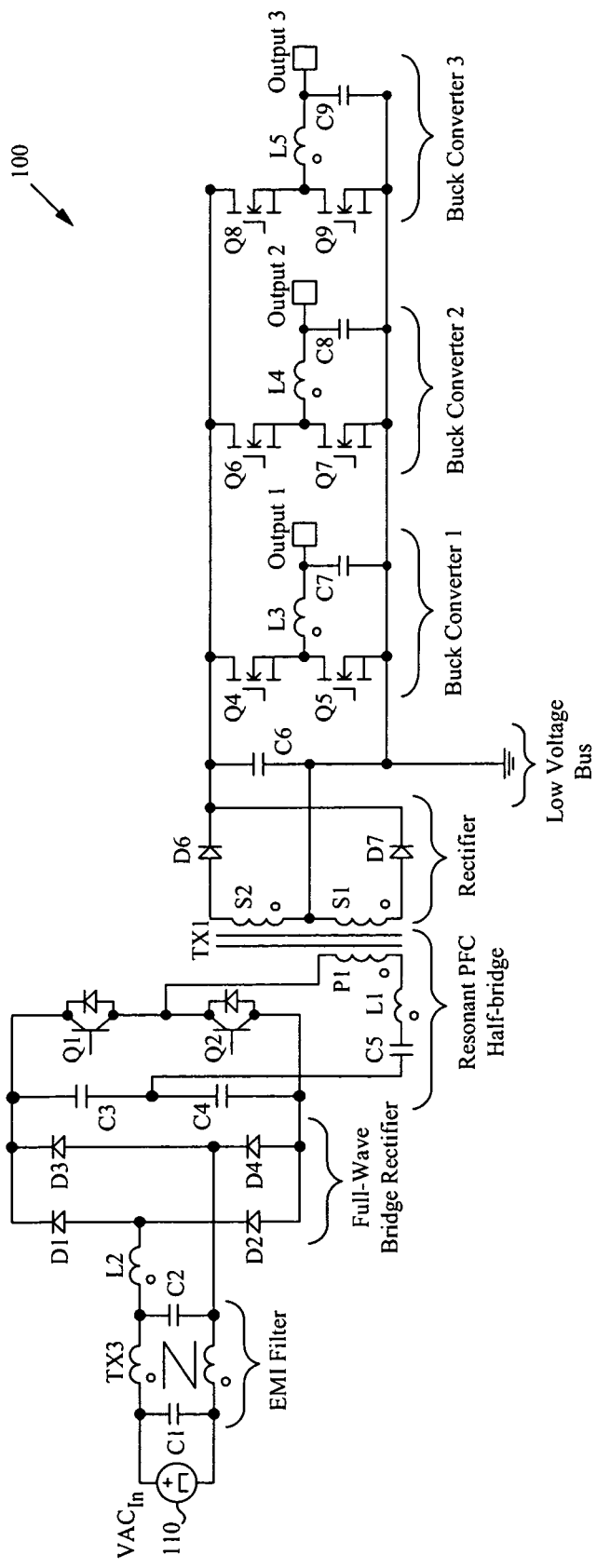
FIG. 4 illustrates an exemplary schematic diagram of a first embodiment of the power train components of the power converter of FIG. 3.

FIG. 4 illustrates an exemplary schematic diagram of a first embodiment of the power train components of the power converter 100 of FIG. 3. The power converter 100 shown in FIG. 4 is configured to include an LLC resonant half-bridge converter followed by buck-type converters. The power source 110 generates the input AC power supply voltage VACin. A capacitor C1, a capacitor C2, a transformer TX3, and an inductor L2 form a line filter for filtering out EMI. The inductor L2 acts as a differential mode filter to filter out the resonant-frequency current. Diodes D1, D2, D3, and D4 form a full-wave bridge rectifier configured to rectify the input line voltage. A capacitor C3, a capacitor C4, a capacitor C5, an inductor L1, a transistor Q1, a transistor Q2, and an isolation transformer TX1 form a resonant half-bridge converter. The transistors Q1 and Q2 function as switches. The capacitor C3 and the capacitor C4 form both the half-bridge center tap as well as input line filtering. In some embodiments, a third capacitor is placed from the cathode of the diode D3 to the anode of the diode D4 to provide additional filtering. In some embodiments, the capacitor C3 and the capacitor C4 are not included, and the capacitor C5 is coupled directly to the anode of the diode D4. However, doing so adds a DC voltage component to the capacitor C5.

The transistors Q1 and Q2 form a half-bridge for switching the voltage at their common connection point between the positive and negative buses. The capacitor C5, the inductor L1, and the parallel inductance of isolation transformer TX1 form a resonant tank. The capacitor C3 and the capacitor C4 provide a DC block for the capacitors C5. The resonant capacitance of the resonant half-bridge converter is the capacitance C5 in series with the parallel combination of the capacitance C3 and the capacitance C4.

The capacitor C5 and the inductor L1 are shown to be in series with the isolation transformer TX1. However, other configurations are well-established practices for operating resonant converters, such as placing the capacitor C5 across the transformer TX1 to form a parallel resonant circuit, or leaving the capacitor C5 in series with the inductor L1 and placing another capacitor across the transformer TX1 to form a series-parallel resonant circuit.

In some embodiments, the inductor L1 is a combination of an external inductor and a leakage inductor of the transformer TX1. In other embodiments, the inductor L1 is simply an external inductor or a leakage inductor of the transformer TX1. In some embodiments, the external inductor is a tunable inductor.

The transformer TX1 is an isolation transformer with center-tapped output. The diodes D6 and D7 provide rectification of the resonant current output from the transformer TX1. In other embodiments, the transformer TX1 is configured as a single output winding, rather than a center-tapped winding. In this case, a full-bridge rectifier is coupled to the output of the transformer TX1. While such a configuration is possible, in practice, the voltage drop across the diodes in a full bridge rectifier causes too much power loss to be practical for most high-efficiency applications, unless those diodes are replaced with synchronous MOSFETs. In some embodiments, the diodes D6 and D7 are each replaced with a metal-oxide-semiconductor field-effect transistor (MOSFET).

The capacitor C6 stores energy to mitigate low-frequency line ripple as well as short-term outage events. Each power converter output, such as the output 1, the output 2, and the output 3, is derived from the voltage on the capacitor C6 using a post-processor converter. The exemplary schematic in FIG. 4 shows buck-type converters to be used for post-processing. A transistor Q4, a transistor Q5, an inductor L3, and a capacitor C7 form a first buck-type converter. The voltage across the capacitor C7 is the first output voltage, output 1. A transistor Q6, a transistor Q7, an inductor L4, and a capacitor C8 form a second buck-type converter. The voltage across the capacitor C8 is the second output voltage, output 2. A transistor Q8, a transistor Q9, an inductor L5, and a capacitor C9 form a third buck-type converter. The voltage across the capacitor C9 is the third output voltage, output 3. In alternative embodiments, quasi-resonant buck-type converters, or even a boost converter (hard-switched or soft-switched) can be used for post-processing. In some cases in which there is one or more high-voltage low-power outputs, but there are also low-voltage high-power outputs, a flyback converter can be used for post-processing the high voltage outputs.

In some embodiments, the transistor Q1 and the transistor Q2 are operated in a complementary fashion, each one driven with a 50% square duty cycle minus a dead-time delay. The dead-time delay is required to prevent shoot-throughs as well as to enable soft-switching. Shoot-through is defined as the condition when both transistors Q1 and Q2 are either fully or partially turned on, thereby providing a path for current to "shoot-through" from the input supply voltage to ground. The transistor switch pair Q4 and Q5, the transistor switch pair Q6 and Q7, and the transistor switch pair Q8 and Q9 operate in a similar manner. In some embodiments, each of the transistors Q1, Q2, and Q4-Q9 is a MOSFET. In other embodiments, the transistors Q1, Q2, and Q4-Q9 can be any other type of semiconductor switching device.

Figure 5:
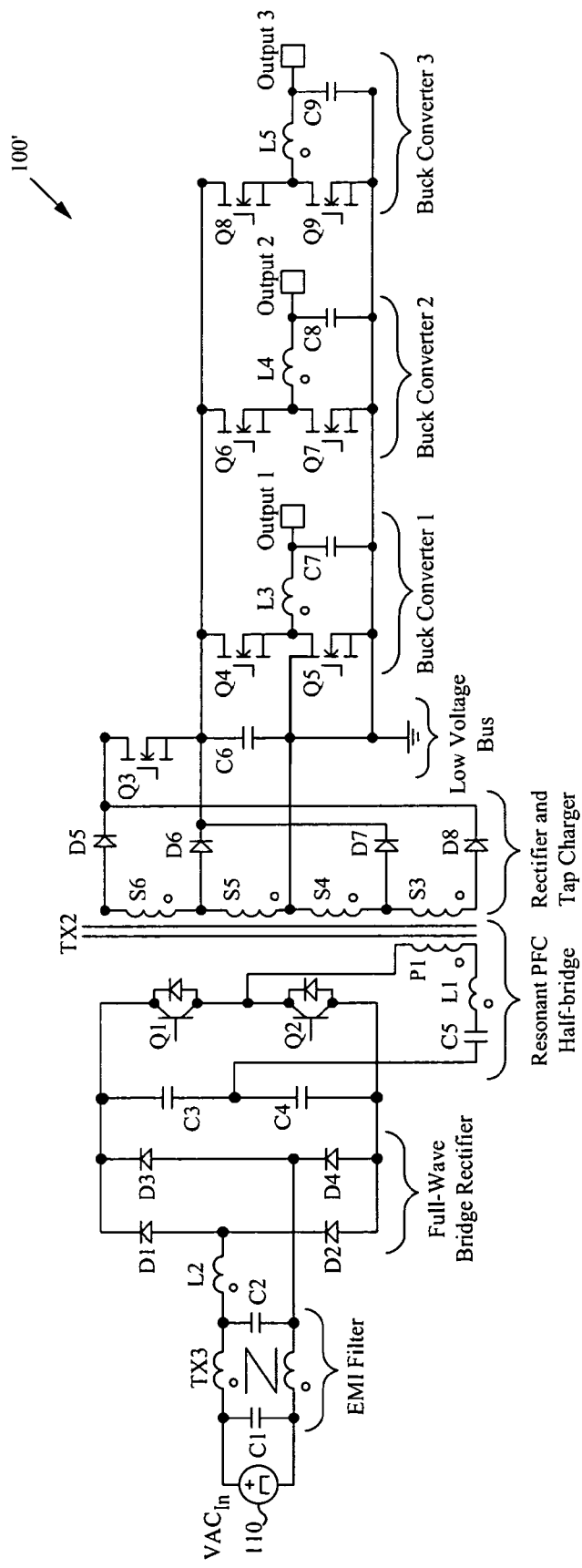
FIG. 5 illustrates an exemplary schematic diagram of a second embodiment of the power train components of the power converter of FIG. 3.

FIG. 5 illustrates an exemplary schematic diagram of a second embodiment of the power train components of the power converter of FIG. 3. The power converter 100' of FIG. 5 is similar to the power converter 100 shown in FIG. 4, except that the transformer TX1 is replaced by the transformer TX2. The transformer TX2 includes four transformer secondaries instead of two transformer secondaries as in the transformer TX1. Each of the four transformer secondaries of the transformer TX2 is coupled to a rectifier, specifically the diodes D5, D6, D7, D8. The diodes D5, D6, D7, D8 provide rectification of the resonant current output from the transformer TX2.

The power converter 100' also differs from the power converter 100 in that the power converter 100' includes a transistor Q3 coupled to each of the additional two transformer secondaries. In some embodiments, the transistor Q3 is a MOSFET. In other embodiments, the transistor Q3 can be any other type of semiconductor switching device. The transistor Q3 couples the diodes D5 and D8 to the capacitor C6. In some embodiments, the transistor Q3 is closed when the magnitude of the input line voltage is below approximately 100V and open when the magnitude of the input line voltage is above approximately 100V. In some embodiments, the sum of the turns on the secondary windings S5 and S6 in FIG. 5 is equivalent to the turns on the secondary winding S2 in FIG. 4, and the sum of the turns on the secondary windings S3 and S4 in FIG. 5 is equivalent to the turns on the secondary winding S1 in FIG. 4. In some embodiments, the diodes D5, D6, D7, D8 are each replaced with a metal-oxide-semiconductor field-effect transistor (MOSFET).

The additional two secondary windings of the transformer TX2, the two diodes D5 and D8, and the transistor Q3 of the power converter 100' in FIG. 5, in comparison to the power converter 100 in FIG. 4, acts as a turns-ratio boost when the input line voltage is high enough not to require an extremely low turns ratio. In this manner, the transistor Q3 is also referred to as a tap switch. This concept, including an exemplary high turns ratio tap, is described in greater detail in U.S. Pat. No. 8,102,678, which is hereby incorporated in its entirety by reference.

In another embodiment, the half-bridge configuration of the resonant PFC converters of FIGS. 4 and 5 is replaced with a switchable bridge configuration. The switchable bridge is configured to switch operation between that of a half-bridge converter and a full-bridge converter. In particular, at low-line voltages, for example 90 VAC-132 VAC, the resonant PFC converter operates as a full-bridge, and at high-line voltages, for example 180 VAC-264 VAC, the resonant PFC converter operates as a half-bridge. A resonant converter frequency operation is a function of the input voltage range. Changing the resonant converter from full-bridge to half-bridge operation decreases the effective voltage range. The frequency range is thus narrowed substantially resulting in more efficient operation and smaller resonant components.

Figure 6:
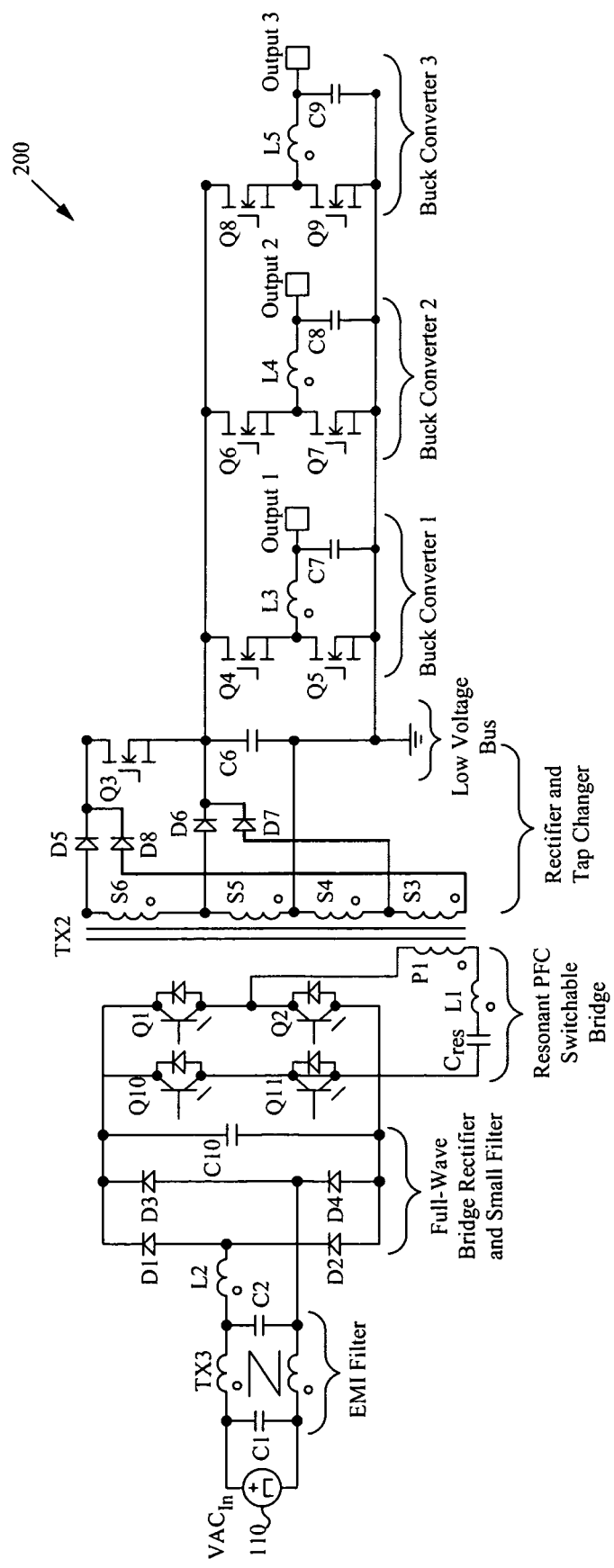
FIG. 6 illustrates an exemplary schematic diagram of a third embodiment of the power train components of the power converter of FIG. 3.

FIG. 6 illustrates an exemplary schematic diagram of a third embodiment of the power train components of the power converter of FIG. 3, including a switchable bridge. The power converter 200 of FIG. 6 is similar to the power converter 100' shown in FIG. 5, except that the half-bridge converter is replaced by a switchable bridge converter. Specifically, the capacitors C3 and C4 of the power converter 100' are replaced by transistors Q10 and Q11, respectively, in the power converter 200. The transistors Q1, Q2, Q10, Q11, the capacitor C5, the inductor L1, and the isolation transformer TX2 form a resonant PFC switchable bridge converter. The function of the two capacitors C3 and C4 (FIG. 5) is incorporated into the resonant capacitor Cres of FIG. 6. The DC bias voltage that is blocked by the capacitors C3 and C4 (FIG. 5) is added to the AC voltage across resonant capacitor Cres. Further, an additional capacitor C10 is coupled across the output of the full-wave bridge rectifier to function as a filter, thus replacing the input filtering function that was performed by C3 and C4. The output of the full-wave bridge rectifier and filter is coupled to the switchable bridge of the resonant PFC converter.

The output side of the power converter 200 is configured similarly to the power converter 100' of FIG. 5, including the secondary transformer windings S3, S4, S5, S6, the diodes D5, D6, D7, D8, the transistors Q3, the capacitor C6, and the three buck-type converters.

The voltage provided to the switchable bridge converter varies between low-line voltage and high-line voltage. At low-line voltage, the switchable bridge converter operates as a full-bridge. At high-line voltage, the switchable bridge operates as a half-bridge. The switchable bridge is configured such that the transistors Q1 and Q11 turn on together and turn off together, and the transistors Q2 and Q10 turn on together and turn off together. At low-line voltage, each of the transistors Q1, Q2, Q10, Q11 are switched on and off, resulting in full-bridge operation. At high-line voltage, the transistor Q10 is turned off continuously, and the transistor Q11 is turned on continuously, while transistors Q1 and Q2 are switched on and off resulting in half-bridge operation. Twice the voltage is placed across the resonant tank (capacitor Cres and inductor L1) and the primary transformer winding P1 in full-bridge operation as compared to half-bridge operation. However, the voltage placed across the resonant tank and transformer primary winding is relative to the voltage across the capacitor C10, which is a function of the AC input voltage. As such, placing twice the amount of voltage across the resonant tank and transformer primary winding during low-line voltages as compared to the voltage placed during high-line voltages results in substantially the same absolute AC voltage being place across the resonant tank and transformer primary winding during both low-line voltage and high-line voltages. In other words, the AC voltage appearing across the resonant tank and transformer primary winding is substantially the same at low-line voltages as at high-line voltages. The only difference in voltage is due to the DC blocking voltage placed across the resonant capacitor Cres. So effectively, the resonant tank and the transformer are operated substantially identically at both low-line voltages and high-line voltages.

In an exemplary application, the input voltage provided by the AC input power source 110 ranges from 90 VAC-264 VAC, the low-line voltage ranges from 90 VAC-132 VAC, and the high-line voltage ranges from 180 VAC-264 VAC. In this example, changing the resonant converter from full-bridge to half-bridge operation decreases the effective voltage range of 90 VAC-264 VAC to 90 VAC-132 VAC.

In some embodiments, the power converter is configured with a switchable bridge for applications that do not require power factor correction. For example, if the capacitor C10 is made very large so as to cause the voltage across the capacitor C10 to be similar to the peak of the AC line voltage, then the switchable bridge configuration still substantially reduces the size and losses of the components in the circuit. Also for isolated DC-to-DC applications in which the input voltage range is approximately 2:1 or more, the switchable bridge provides a reduction in size and losses of the components as compared to a fixed resonant bridge (either full-bridge or half-bridge).

Figure 7C:
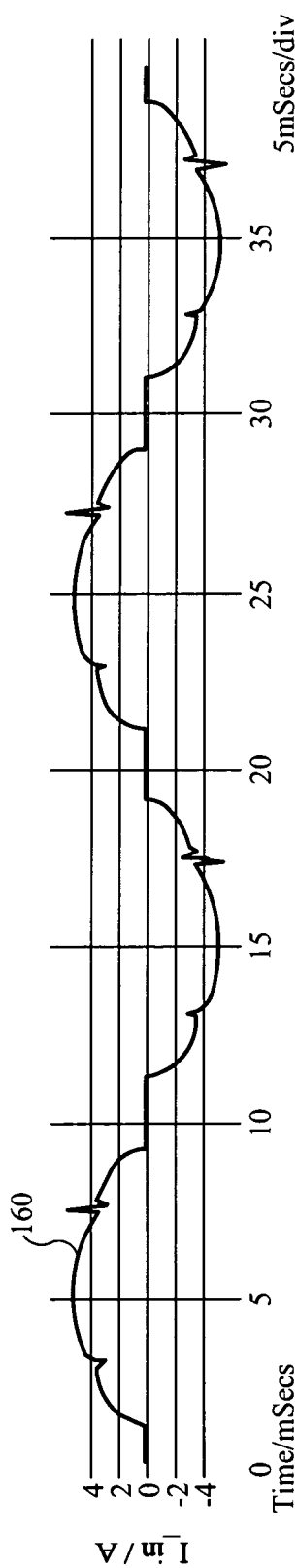
FIG. 7 illustrates various exemplary current and voltage waveforms associated with the power converter of FIG. 6.
Figure 7D:
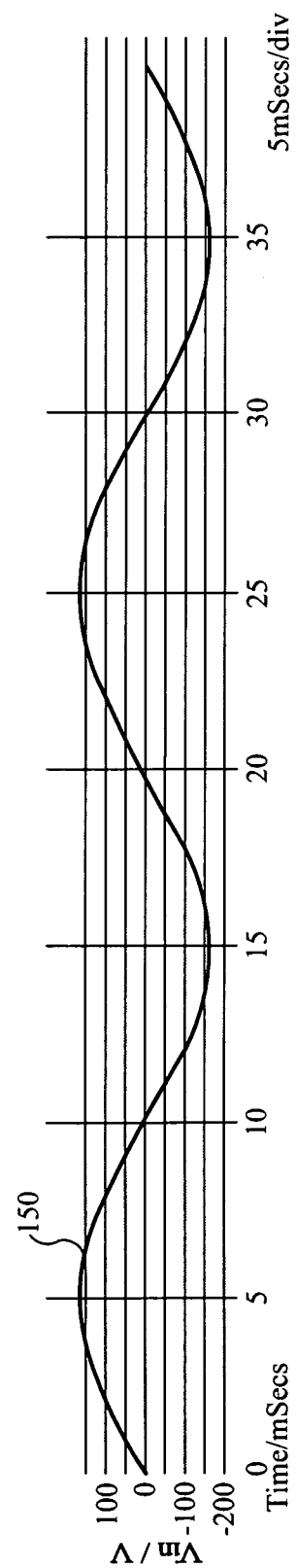

FIG. 7 illustrates various exemplary current and voltage waveforms associated with the power converter 200 of FIG. 6. The waveform 150 corresponds to the AC input voltage to the resonant converter. The waveform 170 corresponds to the DC voltage across the capacitor C6, also referred to as the output voltage Vout of the resonant converter. The waveform 160 corresponds to the input current Iin to the resonant converter. The waveform 180 corresponds to the current Ires through the resonant inductor L1. The exemplary voltage and current levels shown in the waveforms 150-180 correspond to an AC input of 115 VAC.

The waveform 160 resembles a sine wave including a few irregularities. Starting from left to right on the waveform 160, the input current Iin starts and maintains a zero value. As long as the magnitude of the input line voltage Vin is below 48 VDC, no current Iin flows into the resonant converter. This is due to the maximum output voltage of 24 VDC across the capacitor C6. Once the input voltage Vin is greater than 48 VDC, current Iin begins to flow into the resonant converter. At approximately 3 msec, there is an irregularity in the input current Iin, which is due to turning off the transistor Q3, also referred to as the tap switch. The transistor Q3 is turned off when the input line voltage Vin is high enough to halve the turns ratio on the transformer TX2. After turning off the transistor Q3, the input current Iin continues to increase with increasing input line voltage Vin.

The left hand portion of the waveform 180 shows the resonant current Ires rising from 0 amps to approximately 11 amps. Upon turning off the transistor Q3, the resonant current Ires drops to between 6 and 7 amps. The resonant current Ires then continues to rise with increasing input voltage Vin, to a peak value of approximately 11 amps. If the transistor Q3 were not turned on, the resonant current Ires would not have temporarily dropped to between 6 and 7 amps, and instead would have continued to increase to a peak value of approximately 16 amps. By reducing the peak resonant current in this manner, the resonant converter can use smaller passive elements, such as capacitor Cres, inductor L1 and transformer TX2. Reducing the resonant current also reduces the size of the active switches Q1, Q2, Q10, and Q11 as well as the power loss through those components. Using the tap switch (transistor Q3) with the additional secondary windings on TX2 reduces the peak resonant current Ires, which substantially reduces the physical size of the path and the components in the resonant converter.

The transistor Q3 is turned on and off based on the specified values of the input line voltage. These specified trip points are determined such that the peaks of the waveform 180, the peaks when the transistor Q3 is turned on and off and the peak corresponding to the peak input line voltage Vin, are the same, which in this example is approximately 11 amps. In practice, the transistor Q3 can be turned on and off in response to the magnitude of the input line voltage. The line voltage magnitude at which the transistor Q3 is switched increases for increasing rms values of the line voltage. Furthermore, when the switchable bridge is used, the line voltage magnitude at which the transistor Q3 is switched becomes doubled when switching between full-bridge and half-bridge operation. So, for example, if the line voltage magnitude at which the transistor Q3 is switched is 125 VDC when Vin is 115 VAC, then the line voltage magnitude at which the transistor Q3 is switched must be 250 VDC when Vin is 230 VAC.

Although the tap switch (transistor Q3 in FIGS. 5 and 6) is described above as turning on and off according to the input line voltage, it is contemplated that the tap switch is configured to be turned on and off according to other parameters. In general, for a buck-type converter to operate, the input voltage must exceed the output voltage. For an isolated buck-type converter, the input voltage must exceed the output voltage reflected through the transformer turns ratio. If for example the output voltage is 24V, the diode drop on the secondary is 1V, and the turns ratio is 2:1, then the input voltage must exceed 50V to draw any current. If the input voltage exceeds, for example, 100V, then the turns ratio can be changed from 2:1 to 4:1 and still draw current. The exact point at which the tap switch is activated can depend on the turns ratio of the transformer windings (both the standard ratio and the ratio with the tap switch activated), the input current waveform that one is trying to achieve, the ratings of the internal components, the rms value of the input voltage, and the ripple on the output bus.

As previously described, the power converter is configured such that the DC output voltage is regulated. In some embodiments, the power converter includes a control module configured to regulate the DC output voltage. The control module is configured to monitor the DC output voltage, and in response generates and sends control signals to adjust a parameter of the circuit so as to regulate the DC output voltage to a determined level. Adjusting the parameter causes the circuit to operate at a frequency that is closer to or further from the resonant frequency. In some embodiments, a switching frequency is adjusted to accomplish regulation of the DC output. In other embodiments, the DC output is regulated by adjusting a resonant frequency of the resonant tank within the resonant converter, for example by adjusting the value of one of the resonant tank components.

Figure 8:
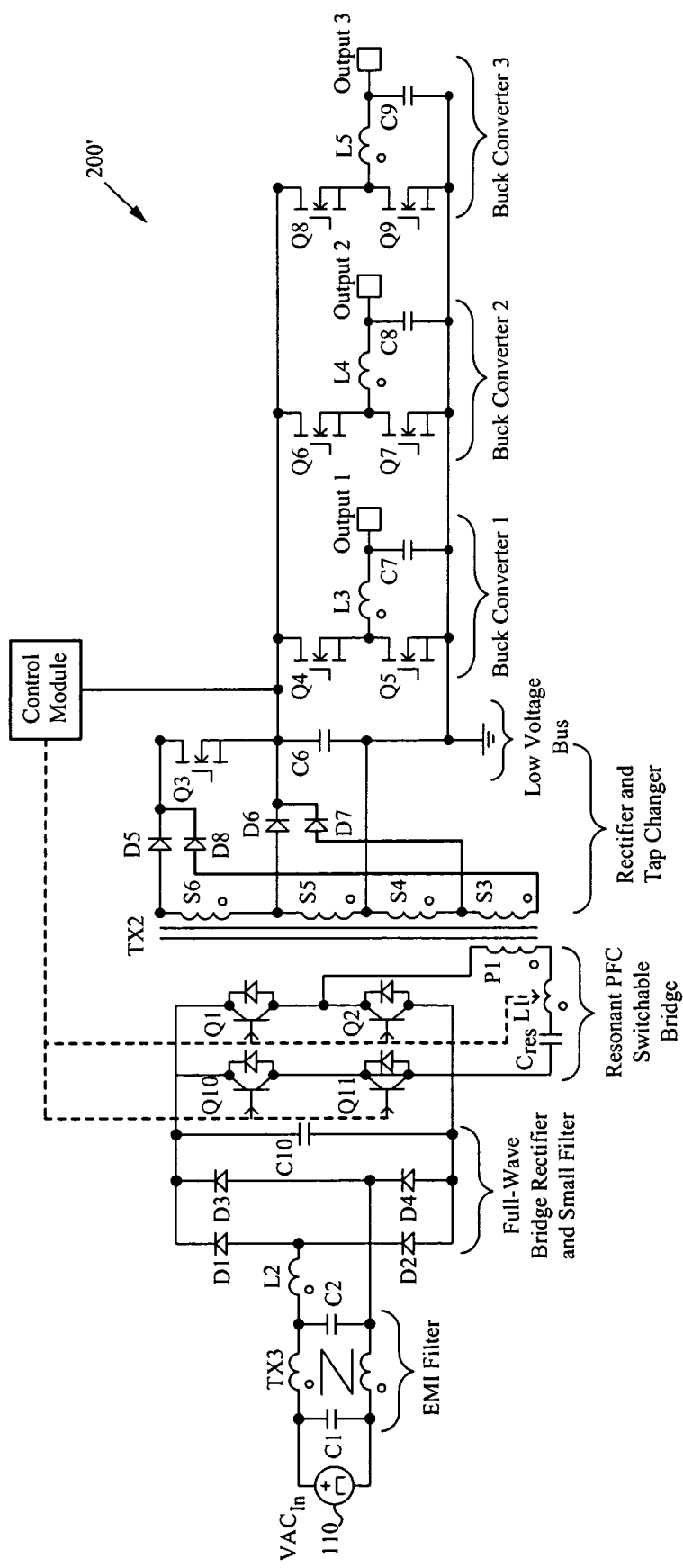
FIG. 8 illustrates an exemplary schematic diagram of one embodiment of the power converter including a control module.

FIG. 8 illustrates an exemplary schematic diagram of one embodiment of the power converter including a control module. The power converter 200' of FIG. 8 is the same as the power converter 200 of FIG. 6 with the addition of a control module 190. The control module 190 is coupled to the voltage output bus from the resonant isolation power stage so as to receive as input the DC output voltage. Outputs from the control module 19Q are coupled to the gate of each of the transistors Q1, Q2, Q10, and Q11 and/or to the tunable inductor L1. Although FIG. 8 shows a single bus coupling the control module 190 to the inductor L1 and to the gate drives of the transistors Q1, Q2, Q10, and Q11, the single bus shown is representing independent control paths between the control module 190 and the inductor L1 and the transistors Q1, Q2, Q10, and Q11. In this manner, the circuit is configured such that the control module 190 provides independent control signals to each of the inductor L1 and the transistors Q1, Q2, Q10, and Q11 so as to maintain independent control of each. The control module 190 generates control signals in response to the received DC output voltage, and sends the control signals to the appropriate transistors and/or tunable inductor so as to regulate the DC output voltage to a determined level. In some embodiments, the control module 190 regulates the DC output voltage by controlling the gate drive frequency of the transistors Q1, Q2, Q10, and Q11, thereby adjusting a switching frequency of the resonant converter. In other embodiments, the control module 190 regulates the DC output voltage by adjusting the resonant inductance value of the resonant tank inductor L1, thereby changing the resonant frequency of the resonant tank.

Although a control module is described above as being applied to the power converter 200 of FIG. 6, it is contemplated that a similarly functioning control module can be used within each embodiment of the power converter described herein.

In some embodiments, the rectifiers at the output of the first stage converter, for example the resonant half-bridge converters in FIGS. 4 and 5 and the resonant switchable bridge in FIG. 6, are configured as passive rectifiers. In other embodiments, the rectifiers at the output of the first stage converter can be configured as synchronous MOSFETs.

In some embodiments, multiple first stage converters can be coupled in parallel, each first stage converter configured to share the input voltage and the bulk output capacitor. In some applications, multiple first stage converters are used to increase the power level and/or to provide redundancy.

The rating of the second-stage components, for example the non-isolated buck-type converters 1,2, and 3 in FIGS. 3-6, is determined by the output current and the bulk output capacitor voltage. The non-isolated buck-type converters therefore use the same components regardless of their output voltages. So, for example, a 10 A-output buck-type converter can be made that is exactly the same for 5V output or 12V output other than the feedback loop reference (the resistor divider in the voltage loop). This makes it practical to design a single output block and program it (either in software or by changing a resistor value) to produce the desired voltage output. Multiple output stages can also be coupled in parallel. For example, two 10 A modules can be placed in parallel to generate a 5V, 20 A output. The output block can also be configured such that the output voltage can be reprogram as desired, such as through a GPIB bus or a connector attached at end-of-line. In some configurations, flash memory can be used to make sure that the output voltage remains correct after being programmed. In contrast, other multiple voltage output converters require substantial transformer redesign each time a different output voltage or different power levels for each of the outputs is desired.

Considering the modular nature of both the first stage converter and the second stage components, the power converter is completely modular where initially a single first stage and a single second stage are designed, and then combinations of the two stages are used to satisfy any design with power level close to or exceeding that of the first stage.

While the power converters 100 and 100' described above are configured using a resonant half-bridge converter, and the power converter 200 is configured using a switchable bridge, it is contemplated that any type of isolated buck-type topologies can be used instead of the half-bridge or switchable bridge topology.

The present invention has been described in terms of specific embodiments incorporating details to facilitate the understanding of the principles of construction and operation of the invention. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A power converter comprising:
   a. a single-stage power-factor-correction resonant converter configured to receive an input voltage, wherein the single-stage power-factor-correction resonant converter includes an isolation transformer and a resonant tank, the resonant tank comprising a variable inductor coupled to a primary of the isolation transformer;
   b. a rectifier coupled to an output of the isolation transformer; and
   c. a bulk capacitor coupled to an output of the rectifier, wherein a voltage across the bulk capacitor is a direct-current output voltage of the single-stage power-factor-correction resonant converter, thereby providing a single voltage output bus for the single-stage power-factor-correction resonant converter, and the variable inductor is configured to tune a resonant frequency of the resonant tank in response to the direct-current output voltage thereby regulating the direct-current output voltage.

2. The power converter of claim 1 further comprising one or more power converters coupled to the bulk capacitor.

3. The power converter of claim 2 wherein each power converter coupled to the bulk capacitor is non-isolated.

4. The power converter of claim 2 wherein each power converter coupled to the bulk capacitor is configured to independently control its output voltage.

5. The power converter of claim 2 wherein each power converter is one of a group consisting of a non-isolated buck-type converter, a non-isolated boost-type converter, and a flyback converter.

6. The power converter of claim 1 further comprising a tap switch coupled between the isolation transformer and the bulk capacitor, wherein the tap switch is configured to increase and decrease a functional turns ratio of the isolation transformer.

7. The power converter of claim 6 wherein the isolation transformer includes a number of secondary windings, and the tap switch couples a portion of the number of secondary windings to the bulk capacitor.

8. The power converter of claim 1 wherein the single-stage power-factor-correction resonant converter includes a switchable bridge configured to operate as a half-bridge converter under high-line voltage conditions and to operate as a full-bridge converter under low-line voltage conditions.

9. The power converter of claim 1 further comprising:
   a. an electromagnetic interference filter; and
   b. a bridge rectifier coupled between an output of the electromagnetic filter and an input of the single-stage power-factor-correction resonant converter.

10. The power converter of claim 9 wherein the bridge rectifier comprises a plurality of diodes.

11. The power converter of claim 9 wherein the bridge rectifier comprises a plurality of metal-oxide-semiconductor field-effect transistors.

12. The power converter of claim 1 wherein the single-stage power-factor-correction resonant converter is configured as one of the group consisting of a series resonant circuit, a parallel resonant circuit, an LLC resonant circuit, and a series-parallel resonant circuit.

13. The power converter of claim 1 wherein the single-stage power-factor-correction resonant converter comprises one of the group consisting of a half-bridge resonant converter, a full-bridge resonant converter, a push-pull resonant converter, and a forward converter.

14. The power converter of claim 1 wherein the rectifier comprises a plurality of diodes.

15. The power converter of claim 1 wherein the rectifier comprises a plurality of metal-oxide-semiconductor field-effect transistors.

16. The power converter of claim 1 wherein the isolation transformer is configured as a step-down transformer.

17. The power converter of claim 1 wherein the input voltage is a rectified DC voltage, and each output voltage is a DC voltage.

18. The power converter of claim 1 wherein the single-stage power-factor-correction resonant converter is configured to operate using soft-switching.

19. The power converter of claim 1 wherein a turns ratio of the isolation transformer is configured to be adapted to match a specific bobbin used in the manufacturing of the isolation transformer.

20. The power converter of claim 1 further comprising a control module configured to regulate the direct-current output voltage and control a value of the at least one variable storage element.

21. An AC-to-DC power converter comprising:
   a. a bridge rectifier configured to receive an input AC voltage, wherein the bridge rectifier is configured to output a DC voltage corresponding to the input AC voltage;
   b. a single-stage power-factor-correction resonant converter coupled to the bridge rectifier to receive the DC voltage, wherein the single-stage power-factor-correction resonant converter includes an isolation transformer, a resonant tank, the resonant tank having at least one variable inductor coupled to a primary of the isolation transformer, and a switchable bridge configured to operate as a half-bridge converter under high-line voltage conditions and to operate as a full-bridge converter under low-line voltage conditions;
   c. a rectifier coupled to an output of the isolation transformer; and
   d. a bulk capacitor coupled to an output of the rectifier, wherein a voltage across the bulk capacitor is an output DC voltage of the AC-to-DC power converter, and the variable inductor is configured to tune a resonant frequency of the resonant tank in response to the output DC voltage thereby regulating the output DC voltage, further wherein the output DC voltage is regulated to substantially the same voltage level whether the switchable bridge is operating as the half-bridge under high-line voltage conditions or as the full-bridge converter under low-line voltage conditions.

22. The power converter of claim 21 further comprising one or more power converters coupled to the bulk capacitor.

23. The power converter of claim 22 wherein each power converter coupled to the bulk capacitor is non-isolated.

24. The power converter of claim 22 wherein each power converter coupled to the bulk capacitor is configured to independently control its output voltage.

25. The power converter of claim 22 wherein each power converter is one of a group consisting of a non-isolated buck-type converter, a non-isolated boost-type converter, and a flyback converter.

26. The power converter of claim 21 further comprising a tap switch coupled between the isolation transformer and the bulk capacitor, wherein the tap switch is configured to increase and decrease a functional turns ratio of the isolation transformer.

27. The power converter of claim 26 wherein the isolation transformer includes a number of secondary windings, and the tap switch couples a portion of the number of secondary windings to the bulk capacitor.

28. The power converter of claim 21 further comprises an electromagnetic interference filter coupled to an input of the bridge rectifier.

29. The power converter of claim 21 wherein the bridge rectifier comprises a plurality of diodes.

30. The power converter of claim 21 wherein the bridge rectifier comprises a plurality of metal-oxide-semiconductor field-effect transistors.

31. The power converter of claim 21 wherein the single-stage power-factor-correction resonant converter is configured as one of the group consisting of a series resonant circuit, a parallel resonant circuit, an LLC resonant circuit, and a series-parallel resonant circuit.

32. The power converter of claim 21 wherein the single-stage power-factor-correction resonant converter comprises one of the group consisting of a half-bridge resonant converter, a full-bridge resonant converter, a push-pull resonant converter, and a forward converter.

33. The power converter of claim 21 wherein the rectifier comprises a plurality of diodes.

34. The power converter of claim 21 wherein the rectifier comprises a plurality of metal-oxide-semiconductor field-effect transistors.

35. The power converter of claim 21 wherein the isolation transformer is configured as a step-down transformer.

36. The power converter of claim 21 wherein the single-stage power-factor-correction resonant converter is configured to operate using soft-switching.

37. The power converter of claim 21 wherein a turns ratio of the isolation transformer is configured to be adapted to match a specific bobbin used in the manufacturing of the isolation transformer.

38. The power converter of claim 21 further comprising a control module configured to regulate the direct-current output voltage and control a value of the at least one variable energy storage element.

39. An AC-to-DC power converter comprising:
 a. a bridge rectifier configured to receive an input AC voltage, wherein the bridge rectifier is configured to output a DC voltage corresponding to the input AC voltage;
 b. a single-stage power-factor-correction resonant converter coupled to the bridge rectifier to receive the DC voltage, wherein the single-stage power-factor-correction resonant converter includes an isolation transformer and a resonant tank, the resonant tank having at least one variable inductor coupled to a primary of the isolation transformer;
 c. a rectifier coupled to an output of the isolation transformer;
 d. a tap switch coupled to an output of the rectifier, wherein the tap switch is configured to increase and decrease a functional turns ratio of the isolation transformer thereby reducing a peak current through the variable inductor; and
 e. a bulk capacitor coupled to the tap switch and to the output of the rectifier, wherein a voltage across the bulk capacitor is an output DC voltage of the AC-to-DC power converter, and the variable inductor is configured to tune a resonant frequency of the resonant tank in response to the output DC voltage thereby regulating the output DC voltage.

40. The power converter of claim 39 wherein the single-stage power-factor-correction resonant converter further comprises a switchable bridge configured to operate as a half-bridge converter under high-line voltage conditions and to operate as a full-bridge converter under low-line voltage conditions.

41. The power converter of claim 39 further comprising one or more power converters coupled to the bulk capacitor.

42. The power converter of claim 41 wherein each power converter coupled to the bulk capacitor is non-isolated.

43. The power converter of claim 41 wherein each power converter coupled to the bulk capacitor is configured to independently control its output voltage.

44. The power converter of claim 41 wherein each power converter is one of a group consisting of a non-isolated buck-type converter, a non-isolated boost-type converter, and a flyback converter.

45. The power converter of claim 39 wherein the isolation transformer includes a number of secondary windings, and the tap switch couples a portion of the number of secondary windings to the bulk capacitor.

46. The power converter of claim 39 further comprising an electromagnetic interference filter coupled to an input of the bridge rectifier.

47. The power converter of claim 39 wherein the bridge rectifier comprises a plurality of diodes.

48. The power converter of claim 39 wherein the bridge rectifier comprises a plurality of metal-oxide-semiconductor field-effect transistors.

49. The power converter of claim 39 wherein the single-stage power-factor-correction resonant converter is configured as one of the group consisting of a series resonant circuit, a parallel resonant circuit, an LLC resonant circuit, and a series-parallel resonant circuit.

50. The power converter of claim 39 wherein the single-stage power-factor-correction resonant converter comprises one of the group consisting of a half-bridge resonant converter, a full-bridge resonant converter, a push-pull resonant converter, and a forward converter.

51. The power converter of claim 39 wherein the rectifier comprises a plurality of diodes.

52. The power converter of claim 39 wherein the rectifier comprises a plurality of metal-oxide-semiconductor field-effect transistors.

53. The power converter of claim 39 wherein the isolation transformer is configured as a step-down transformer.

54. The power converter of claim 39 wherein the single-stage power-factor-correction resonant converter and each of the non-isolated power converters are configured to operate using soft-switching.

55. The power converter of claim 39 wherein a turns ratio of the isolation transformer is configured to be adapted to match a specific bobbin used in the manufacturing of the isolation transformer.

56. The power converter of claim 39 further comprising a control module configured to regulate the direct-current output voltage and control a value of the at least one variable energy storage element.

57. An AC-to-DC power converter comprising:
 a. a bridge rectifier configured to receive an input AC voltage, wherein the bridge rectifier is configured to output a DC voltage corresponding to the input AC voltage;

b. a single-stage power-factor-correction resonant converter coupled to the bridge rectifier to receive the DC voltage, wherein the single-stage power-factor-correction resonant converter includes an isolation transformer, a resonant tank, the resonant tank having at least one variable inductor coupled to a primary of the isolation transformer, and a switchable bridge configured to operate as a half-bridge converter under high-line voltage conditions and to operate as a full-bridge converter under low-line voltage conditions;

c. a rectifier coupled to an output of the isolation transformer;

d. a tap switch coupled to an output of the rectifier, wherein the tap switch is configured to increase and decrease a functional turns ratio of the isolation transformer; and e. a bulk capacitor coupled to the tap switch and to the output of the rectifier, wherein a voltage across the bulk capacitor is an output DC voltage of the AC-to-DC power converter and the variable inductor is configured to tune a resonant frequency of the resonant tank in response to the output DC voltage thereby regulating the output DC voltage, further wherein the output DC voltage is regulated to substantially the same voltage level whether the switchable bridge is operating as the half-bridge under high-line voltage conditions or as the full-bridge converter under low-line voltage conditions.

58. The power converter of claim 57 further comprising an electromagnetic interference filter coupled to an input of the bridge rectifier.

59. The power converter of claim 57 further comprising one or more power converters coupled to the bulk capacitor.

60. The power converter of claim 59 wherein each power converter coupled to the bulk capacitor is non-isolated.

61. The power converter of claim 59 wherein each power converter coupled to the bulk capacitor is configured to independently control its output voltage.

62. The power converter of claim 59 wherein each power converter is one of a group consisting of a non-isolated buck-type converter, a non-isolated boost-type converter, and a flyback converter.

63. The power converter of claim 57 wherein the isolation transformer includes a number of secondary windings, and the tap switch couples a portion of the number of secondary windings to the bulk capacitor.

64. The power converter of claim 57 wherein the bridge rectifier comprises a plurality of diodes.

65. The power converter of claim 57 wherein the bridge rectifier comprises a plurality of metal-oxide-semiconductor field-effect transistors.

66. The power converter of claim 57 wherein the single-stage power-factor-correction resonant converter is configured as one of the group consisting of a series resonant circuit, a parallel resonant circuit, an LLC resonant circuit, and a series-parallel resonant circuit.

67. The power converter of claim 57 wherein the rectifier comprises a plurality of diodes.

68. The power converter of claim 57 wherein the rectifier comprises a plurality of metal-oxide-semiconductor field-effect transistors.

69. The power converter of claim 57 wherein the isolation transformer is configured as a step-down transformer.

70. The power converter of claim 57 wherein the single-stage power-factor-correction resonant converter and each of the non-isolated power converters are configured to operate using soft-switching.

71. The power converter of claim 57 wherein a turns ratio of the isolation transformer is configured to be adapted to match a specific bobbin used in the manufacturing of the isolation transformer.

72. The power converter of claim 57 further comprising a control module configured to regulate the direct-current output voltage and control a value of the at least one variable energy storage element.

* * * * *